US012807031B2

(12) United States Patent
Song et al.

(10) Patent No.: US 12,807,031 B2
(45) Date of Patent: Nov. 24, 2026

(54) ROBOT PICKUP OR DELIVERY SYSTEM AND PICKUP OR DELIVERY ROBOT

(71) Applicant: HONDA MOTOR CO., LTD., Tokyo (JP)

(72) Inventors: Wei Song, Wako (JP); Katsuyoshi Watari, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 18/292,205

(22) PCT Filed: Jul. 30, 2021

(86) PCT No.: PCT/JP2021/028484
§ 371 (c)(1),
(2) Date: Jan. 25, 2024

(87) PCT Pub. No.: WO2023/007744
PCT Pub. Date: Feb. 2, 2023

(65) Prior Publication Data
US 2024/0278679 A1 Aug. 22, 2024

(51) Int. Cl.
*B60L 53/80* (2019.01)
*B25J 11/00* (2006.01)
(Continued)

(52) U.S. Cl.
CPC ............ *B60L 53/80* (2019.02); *B25J 11/008* (2013.01); *B60L 53/305* (2019.02); *G01C 21/3407* (2013.01)

(58) Field of Classification Search
CPC ........ B60L 53/80; B60L 53/305; B60L 58/12; B60L 58/13; B25J 11/008; G01C 21/3407; G05D 1/02; G05D 1/24; G05D 2105/28
See application file for complete search history.

(56) References Cited

U.S. PATENT DOCUMENTS

2008/0109114 A1* 5/2008 Orita .................... B25J 19/005 901/50
2018/0175638 A1* 6/2018 Zhu .................... H01M 50/204
(Continued)

FOREIGN PATENT DOCUMENTS

JP 2012-145499 A 8/2012
JP 2014-3803 A 1/2014
(Continued)

OTHER PUBLICATIONS

International Search Report Corresponding to International Application No. PCT/JP2021/028484 dated Oct. 19, 2021, 2 pages.
(Continued)

*Primary Examiner* — Russell Frejd
(74) *Attorney, Agent, or Firm* — Rankin, Hill & Clark LLP

(57) ABSTRACT

A robot pickup or delivery system includes: a pickup or delivery robot; a storage device; and a notification section. The pickup or delivery robot includes a detachable battery and a carrier. The pickup or delivery robot is configured to pick up or deliver a package. The detachable battery is a power source. The carrier is configured to be loaded with a package. The storage device is configured to store information related to a depository of the detachable battery. The notification section is configured to issue a notification to a depositary with whom the detachable battery is deposited in the depository when a remaining charge level of the detachable battery attached to the pickup or delivery robot is lower than or equal to a predetermined value. The notification is for requesting the attached detachable battery to be replaced.

10 Claims, 6 Drawing Sheets

(51) Int. Cl.
*B60L 53/30* (2019.01)
*G01C 21/34* (2006.01)

(56) References Cited

U.S. PATENT DOCUMENTS

| | | | | |
|---|---|---|---|---|
| 2018/0183254 | A1* | 6/2018 | Park | H01M 10/425 |
| 2019/0178663 | A1 | 6/2019 | Mukai et al. | |
| 2019/0265716 | A1 | 8/2019 | Nasu | |
| 2021/0061124 | A1* | 3/2021 | Kim | B60L 53/16 |

FOREIGN PATENT DOCUMENTS

| | | | |
|---|---|---|---|
| JP | 2014-56589 | A | 3/2014 |
| JP | 2017-19265 | A | 1/2017 |
| JP | 2019-149854 | A | 9/2019 |
| WO | 2018/061415 | A1 | 4/2018 |
| WO | 2020116571 | A1 | 6/2020 |

OTHER PUBLICATIONS

Written Opinion Corresponding to International Application No. PCT/JP2021/028484 dated Oct. 19, 2021, 4 pages.

International Preliminary Report on Patentability, International Application No. PCT/JP2021/028484, Date of mailing: Feb. 8, 2024, 6 pages.

* cited by examiner

ROBOT PICKUP OR DELIVERY SYSTEM AND PICKUP OR DELIVERY ROBOT

TECHNICAL FIELD

The present invention relates to a robot pickup or delivery system in which a pickup or delivery robot including a battery picks up or delivers a package, and a pickup or delivery robot.

BACKGROUND ART

Patent Literature 1 discloses a printed-matter delivery system that uses a delivery device which includes a battery and autonomously travels with power. In this printed-matter delivery system, for example, the delivery device uses a place where a printing device is installed as a home position and has the battery charged by a charger installed at the home position. The delivery device compares the amount of required power necessary to return to a delivery start position after delivery and the remaining battery level as appropriate during the delivery. When the remaining battery level becomes lower than the amount of required power during the delivery, the delivery device then changes the destination to the home position, and starts travelling again to the delivery place of a printed matter after completely charged at the home position.

CITATION LIST

Patent Literature

[Patent Literature 1]
Japanese Patent Laid-Open No. 2017-19265

SUMMARY OF INVENTION

Technical Problem

In the conventional printed-matter delivery system described above, the delivery device returns to the home position to have the battery charged whenever the remaining battery level becomes insufficient during delivery, and additional traveling distance (i.e., the amount of power to be consumed) and traveling time for the charging are thus necessary, which can decrease the delivery efficiency (e.g., delivery quantity per time or per power consumption).

An object of the present invention is to achieve high delivery efficiency while avoiding an increase in delivery time, traveling distance, and/or power consumption in a robot pickup or delivery system in which a pickup or delivery robot including a battery picks up or delivers a package even when the remaining battery level of the pickup or delivery robot becomes insufficient during the delivery.

Solution to Problem

An aspect of the present invention is a robot pickup or delivery system in which a pickup or delivery robot picks up or delivers a package. The pickup or delivery robot includes a detachable battery and a carrier. The detachable battery is a power source. The carrier is configured to be loaded with a package. The robot pickup or delivery system includes: a storage device; and a notification section. The storage device is configured to store information related to a depository of the detachable battery. The notification section is configured to issue a notification to a depositary with whom the detachable battery is deposited in the depository when a remaining charge level of the detachable battery attached to the pickup or delivery robot is lower than or equal to a predetermined value. The notification is for requesting the attached detachable battery to be replaced.

According to another aspect of the present invention, the notification includes information related to a method for replacing the detachable battery in the pickup or delivery robot.

According to another aspect of the present invention, the notification section issues the notification of the request to the depositary through a terminal device of the depositary before the pickup or delivery robot reaches the depository.

According to another aspect of the present invention, the notification section outputs the notification when the pickup or delivery robot reaches the depository. The notification is for requesting the detachable battery to be replaced.

According to another aspect of the present invention, a charge state obtaining section is included. The charge state obtaining section is configured to obtain information related to a remaining charge level of the detachable battery in the depository. When the remaining charge level of the detachable battery in the depository is higher than or equal to a predetermined value, the notification section outputs a notification for requesting the detachable battery to be replaced in the depository.

According to another aspect of the present invention, the depository includes a place serving as a delivery place and/or a pickup place of the package.

According to another aspect of the present invention, a charge state obtaining section; and a route plan section are included. The charge state obtaining section is configured to obtain information related to a remaining charge level of the detachable battery in the depository. The route plan section is configured to plan a moving route for the pickup or delivery robot to drop in at a delivery place and/or a pickup place of the package. The route plan section plans the moving route to drop in at the depository of the detachable battery whose remaining charge level is higher than or equal to a predetermined value.

According to another aspect of the present invention, the route plan section decides the depository to drop in at on the moving route, and an order to drop in at the depository and the delivery place and/or the pickup place on the basis of the remaining charge level of the detachable battery attached to the pickup or delivery robot, positional information related to the depository and the remaining charge level of the detachable battery deposited in each of the depositories, and an amount of power consumed by the pickup or delivery robot per unit traveling distance.

According to another aspect of the present invention, when the remaining charge level of the detachable battery attached to the pickup or delivery robot becomes lower than or equal to a predetermined value during movement, the route plan section changes the moving route to drop in at the depository.

According to another aspect of the present invention, a charger to which the detachable battery is connected is distributed to the depository, and the charge state obtaining section obtains information from the charger. The information is related to the remaining charge level of the detachable battery in the depository.

According to another aspect of the present invention, a billing section is included. The billing section is configured to issue a bill for a pickup or delivery service of the package. When the detachable battery of the pickup or delivery robot is replaced in the depository, the billing section provides an incentive to the depositary of the depository.

Another aspect of the present invention is a pickup or delivery robot to which a detachable battery is attached. The pickup or delivery robot is configured to pick up or deliver a package. The pickup or delivery robot includes: a deposit information obtaining section; and a notification section. The deposit information obtaining section is configured to obtain information related to a depository of the detachable battery. The notification section is configured to issue a notification to a depositary with whom the detachable battery is deposited in the depository when a remaining charge level of the attached detachable battery is lower than or equal to a predetermined value. The notification is for requesting the attached detachable battery to be replaced.

Advantageous Effect of Invention

According to the present invention, it is possible to achieve high delivery efficiency while avoiding an increase in delivery time, traveling distance, and/or power consumption in a robot pickup or delivery system in which a pickup or delivery robot including a battery picks up or delivers a package even when the remaining battery level of the pickup or delivery robot becomes insufficient during the delivery.

DESCRIPTION OF EMBODIMENTS

The following describes embodiments of the present invention with reference to the drawings.

[1. Configuration of Robot Pickup or Delivery System]

Figure 1:
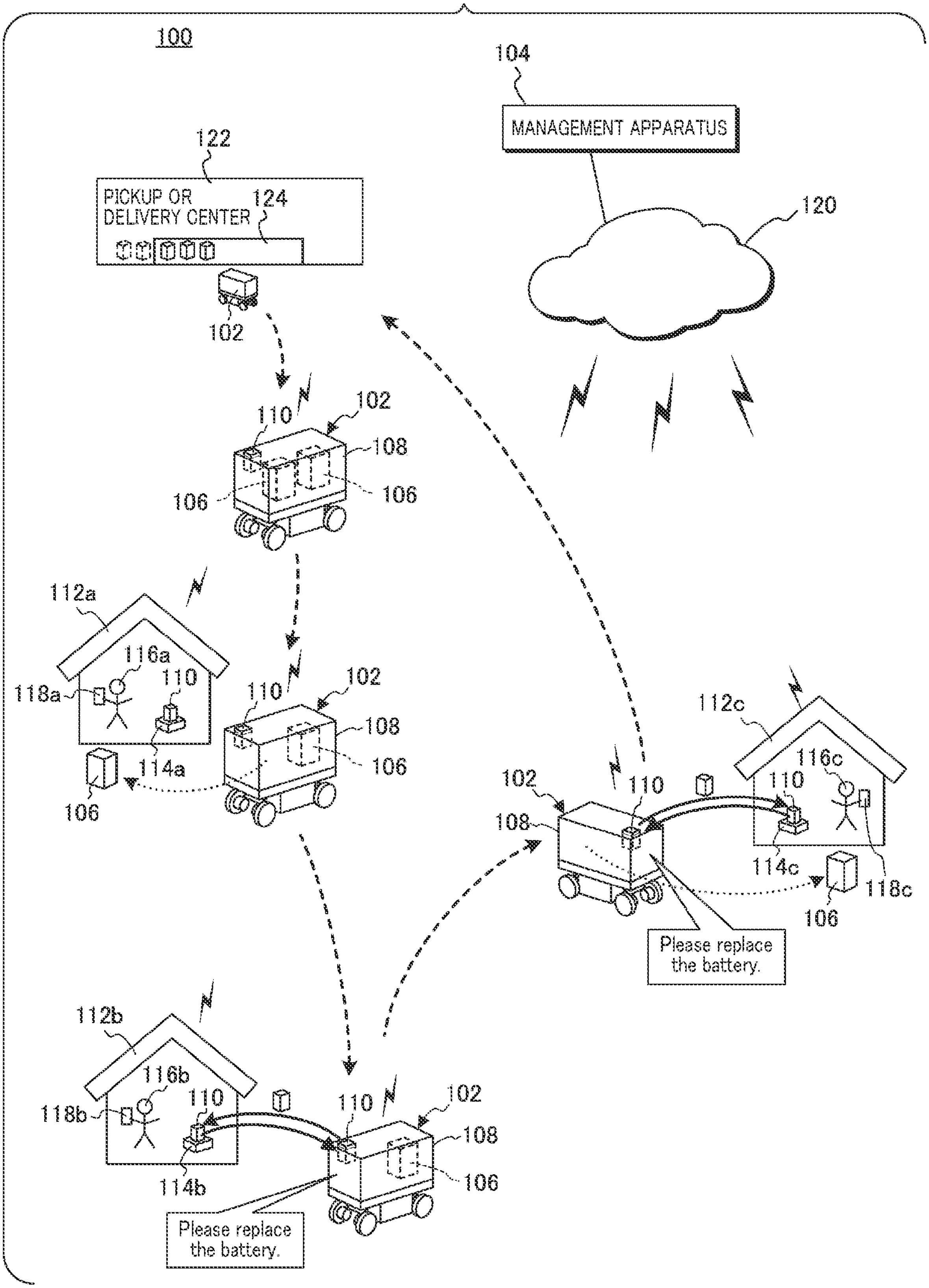
FIG. 1 is a diagram illustrating an example of a configuration of a robot pickup or delivery system according to an embodiment of the present invention along with a scene in which the robot pickup or delivery system is used.

FIG. 1 is a diagram illustrating a configuration of a robot pickup or delivery system 100 according to an embodiment of the present invention along with a scene in which the robot pickup or delivery system 100 is used. The robot pickup or delivery system 100 includes at least one pickup or delivery robot 102 and a management apparatus 104. The management apparatus 104 is, for example, a server.

The pickup or delivery robot 102 includes a packing box 108 in which an item 106 is put and travels by using power from an attached detachable battery 110 as a power source. In the scene illustrated in FIG. 1, the pickup or delivery robot 102 travels along illustrated dotted arrows and picks up or delivers the item 106 that is a package. It is to be noted that the example illustrated in FIG. 1 depicts the one pickup or delivery robot 102, but any number of pickup or delivery robots 102 may be included in the robot pickup or delivery system 100.

The robot pickup or delivery system 100 additionally includes chargers 114*a*, 114*b*, and 114*c* disposed in depositories 112*a*, 112*b*, and 112*c* of the interchangeable detachable batteries 110. The following also refers to the depositories 112*a*, 112*b*, and 112*c* generically as the depositories 112 and also refers to the chargers 114*a*, 114*b*, and 114*c* generically as the chargers 114. In the respective depositories 112, the detachable batteries 110 connected to the respective chargers 114 are deposited.

The robot pickup or delivery system 100 may additionally include portable terminals 118*a*, 118*b*, and 118*c* of depositaries 116*a*, 116*b*, and 116*c* with whom the detachable batteries 110 are deposited in the depositories 112*a*, 112*b*, and 112*c*, respectively. The following also refers to the depositaries 116*a*, 116*b*, and 116*c* generically as the depositaries 116 and also refers to the portable terminals 118*a*, 118*b*, and 118*c* generically as the portable terminals 118.

The pickup or delivery robot 102, the management apparatus 104, the charger 114, and the portable terminal 118 are communicably connected through a communication network 120.

The depository 112 includes a place that is (or can be) the delivery place and/or the pickup place of a package such as the item 106. In the present embodiment, the depository 112 is the residence of a registration user who is registered in advance in the management apparatus 104 as a user of an item pickup or delivery service by the robot pickup or delivery system 100 and permits the detachable battery 110 to be kept. In addition, the depositary 116 of the depository 112 is the registration user described above.

The pickup or delivery robot 102 stands by, for example, in a predetermined pickup or delivery center 122 and delivers an item to a delivery place designated by the management apparatus 104 and/or picks up an item from a pickup place designated by the management apparatus 104 in accordance with a pickup or delivery instruction from the management apparatus 104. The pickup or delivery robot 102 is loaded with items, for example, by a loading device 124 installed in the pickup or delivery center 122 in accordance with the pickup or delivery instruction received from the management apparatus 104 through the communication network 120. In addition, the pickup or delivery center 122 is provided, for example, with a charging device (not illustrated) as a so-called home position to which the pickup or delivery robot 102 docks the pickup or delivery robot 102 itself for charging. When returning to the pickup or delivery center 122 after delivery is completed, the pickup or delivery robot 102 is charged by being docked to the charging device serving as the home position described above.

The following refers to the delivery place of an item and the pickup place of an item generically as pickup or delivery places. In addition, an operation of the pickup or delivery robot moving to a pickup or delivery place from the pickup or delivery center 122 to pick up or deliver an item and then returning to the pickup or delivery center 122 again will be referred to as a pickup or delivery operation. It is to be noted that the pickup or delivery instruction described above is an instruction to execute the pickup or delivery operation described above. The pickup or delivery instruction transmitted to the pickup or delivery center 122 and the pickup or delivery robot 102 by the management apparatus 104 includes, for example, positional information related to at least one destination including a pickup or delivery place and the designation of a moving route back to the pickup or delivery center 122 through each destination. The pickup or delivery instruction will be described in detail below.

Here, the pickup or delivery place of an item may be not only the depository 112, but also a general residence or building that is not the depository 112.

The management apparatus 104 plans a moving route for the pickup or delivery robot 102 to return to the pickup or delivery center 122 through the pickup or delivery place. In particular, in the robot pickup or delivery system 100, the management apparatus 104 causes the depository 112 to be included in the moving route as a destination or a transit point to prevent the remaining charge level of the detachable battery 110 attached to the pickup or delivery robot 102 from becoming insufficient during the return to the pickup or delivery center 122 through the pickup or delivery place. In this case, the depository 112 included in the moving route may be the pickup or delivery place of an item or does not have to be the pickup or delivery place.

In addition, in particular, when arriving at the depository 112 that is a transit point, the pickup or delivery robot 102 in the robot pickup or delivery system 100 outputs a replacement request notification, for example, to the depositary 116 for requesting the detachable battery 110 attached to the pickup or delivery robot 102 to be replaced in that depository 112. This replacement request notification may be, for example, a voice message and/or a text message outputted from the pickup or delivery robot 102. In addition, the replacement request notification may include information related to a method for replacing the detachable battery in the pickup or delivery robot 102. The following also refers to the remaining charge level of the detachable battery 110 attached to the pickup or delivery robot 102 as the remaining charge level of the pickup or delivery robot 102.

In the example illustrated in FIG. 1, the pickup or delivery robot 102 delivers the items 106 by using the two depositories 112*a* and 112*c* as delivery places. The management apparatus 104 obtains the remaining charge level of the pickup or delivery robot 102 from that pickup or delivery robot 102. The management apparatus 104 determines on the basis of the remaining charge level of the pickup or delivery robot 102 that the remaining charge level of the pickup or delivery robot 102 is to be less than or equal to a predetermined value between the depositories 112*a* and 112*c* which are delivery places, and plans a moving route for the pickup or delivery robot 102 to drop in at the nearest depository 112*b* that is not a pickup or delivery place on the way to the depository 112*c* from 112*a* that are delivery places. The management apparatus 104 then transmits, to the pickup or delivery robot 102, a pickup or delivery instruction including the depository 112*a* that is a delivery place, the depository 112*b* that is not a pickup or delivery place, and the depository 112*c* that is a delivery place as destinations and including the designation of the planned moving route described above.

The pickup or delivery robot 102 that receives the pickup or delivery instruction departs from the pickup or delivery center 122 with the two items 106 loaded thereon and returns to the pickup or delivery center 122 through the depository 112*a* that is a delivery place, the depository 112*b* that is not a pickup or delivery place, and the depository 112*c* that is a delivery place in order as indicated by the illustrated dashed arrows.

In the depository 112*a* that is the first destination and a delivery place, the first item 106 is taken out from the pickup or delivery robot 102 by the depositary 116*a* who is a recipient (illustrated dotted arrow). As described below, the pickup or delivery robot 102 includes a cargo compartment door for each of partitioned cargo compartments. The depositary 116*a* who is a recipient is able to take out the item delivered to himself or herself by entering an unlock code of which the portable terminal 118*a* is informed in advance from the management apparatus 104 into the pickup or delivery robot 102. In the example illustrated in FIG. 1, the remaining charge level of the pickup or delivery robot 102 exceeds the predetermined value at the time of the arrival at the depository 112*a* and the pickup or delivery robot 102 thus issues no replacement request notification to the depositary 116*a*.

Next, in the depository 112*b* that is the second destination, but is not a pickup or delivery place, the remaining charge level of the pickup or delivery robot 102 is lower than or equal to the predetermined value at the time of the arrival at the depository 112*b* and the pickup or delivery robot 102 thus issues a replacement request notification to the depositary 116*b* by using, for example, a voice message "Please replace the battery" or the like. This causes the depositary 116*b* to replace the detachable battery 110 attached to the pickup or delivery robot 102 with the detachable battery 110 connected to the charger 114*b* installed in the depository 112*b* (illustrated solid arrows).

In this case, the pickup or delivery robot 102 is capable of predicting a decrease in the remaining charge level of that pickup or delivery robot 102 before the arrival at the depository 112*b* and transmitting a replacement request notification in advance to the portable terminal 118*b* of the depositary 116*b* of the depository 112*b*.

Finally, in the depository 112*c* that is the third destination and a delivery place, the second item 106 is taken out from the pickup or delivery robot 102 by the depositary 116*c* who is a recipient as with the case of the depository 112*a* (illustrated dotted arrow). In addition, in the depository 112*c*, the remaining charge level of the pickup or delivery robot 102 is lower than or equal to the predetermined value at the time of the arrival at the depository 112*c* as in the depository 112*a* and the pickup or delivery robot 102 thus issues a replacement request notification to the depositary 116*c* by using a voice message "Please replace the battery" or the like. This causes the depositary 116*c* to replace the detachable battery 110 attached to the pickup or delivery robot 102 with the detachable battery 110 connected to the charger 114*c* installed in the depository 112*c* (illustrated solid arrows).

Even in this case, the pickup or delivery robot 102 is capable of predicting a decrease in the remaining charge level of that pickup or delivery robot 102 before the arrival at the depository 112*c* and transmitting a replacement request notification in advance to the portable terminal 118*c* of the depositary 116*c* of the depository 112*c*. After that, the pickup or delivery robot 102 returns to the pickup or delivery center 122 along the moving route designated by the pickup or delivery instruction.

In the robot pickup or delivery system 100 described above, when the remaining charge level of the attached detachable battery 110 is lower than or equal to the predetermined value during pickup or delivery, the pickup or delivery robot 102 outputs, for example, to the depositary 116 of the depository 112, a replacement request notification for requesting the attached detachable battery 110 to be replaced there. This allows the pickup or delivery robot 102 to have the detachable battery 110 replaced by the depositary 116 or the like during the pickup or delivery.

This allows the pickup or delivery robot 102 in the robot pickup or delivery system 100 to achieve high delivery efficiency while avoiding an increase in delivery time, traveling distance, and/or power consumption in a pickup or delivery operation without requiring the pickup or delivery robot 102 to move to a specific place (e.g., return to the pickup or delivery center 122) provided with a special charger to which the pickup or delivery robot 102 docks the pickup or delivery robot 102 itself for charging unlike the conventional technology even when the remaining charge level of the pickup or delivery robot 102 becomes insufficient during the pickup or delivery.

It is to be noted that the example illustrated in FIG. 1 illustrates the three depositories 112, but any number of depositories 112 may be included. In addition, to secure areas that allow the pickup or delivery robot 102 to pick up and deliver packages everywhere within a predetermined region, it is desirable to distribute and provide the plurality of depositories 112 within the predetermined region.

[2. Configuration of Pickup or Delivery Robot]

Figure 2:
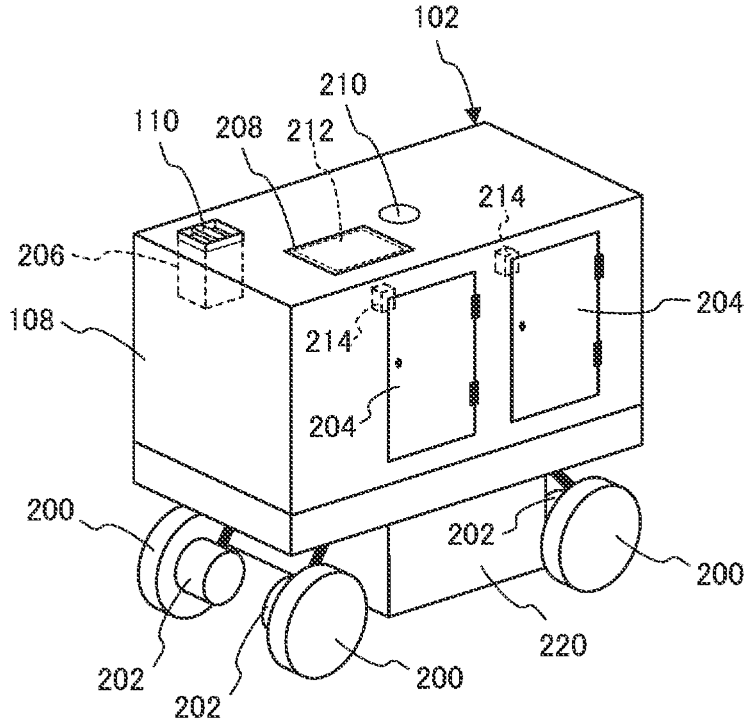
FIG. 2 is a diagram illustrating a configuration of a pickup or delivery robot included in the robot pickup or delivery system.

FIG. 2 is a diagram illustrating a configuration of the pickup or delivery robot 102. The pickup or delivery robot 102 includes the packing box 108 in which an item is put, four wheels 200 for moving or traveling, and four drive motors 202 that drive these four respective wheels (the three wheels 200 and the three drive motors 202 are visible in the perspective view illustrated in FIG. 2). Here, the item corresponds to a package and the packing box 108 corresponds to a carrier on which the package is loaded. It is to be noted that the carrier is not limited to the packing box 108, but may be any structure on which the package is loaded. For example, the carrier may be a table that is provided on the upper surface of the pickup or delivery robot 102 and has a package placed thereon or a trolley that is connected to and towed by the pickup or delivery robot 102 instead of the packing box 108.

The inside of the packing box 108 is partitioned into two cargo compartments and the outer surface of the packing box 108 is provided with two cargo compartment doors 204 for accessing the respective cargo compartments. Each of the cargo compartment doors 204 is locked and unlocked by a door lock mechanism 214 included in the packing box 108.

In addition, the packing box 108 includes a battery socket 206, a display device 208, and a speaker 210. The display device 208 is, for example, a liquid crystal display and includes a touch panel 212 provided on the display screen. The battery socket 206 has detachably attached thereto the detachable battery 110 that is a power source of the drive motors 202. The pickup or delivery robot 102 also includes a control apparatus 220.

Figure 3:
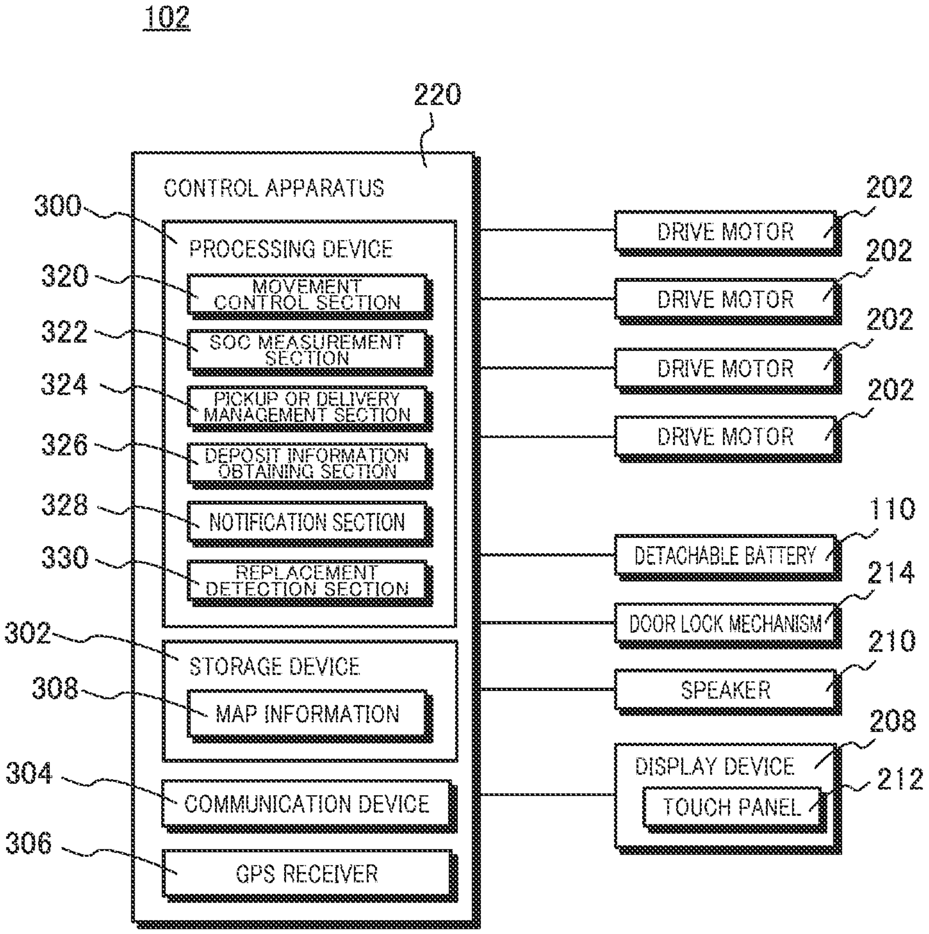
FIG. 3 is a diagram illustrating a functional configuration of the pickup or delivery robot.

FIG. 3 is a diagram illustrating a functional configuration of the pickup or delivery robot 102. The control apparatus 220 includes a processing device 300, a storage device 302, a communication device 304, and a GPS receiver 306. The storage device 302 includes, for example, a volatile and/or non-volatile semiconductor memory, and/or a hard disk device, and/or the like, and stores map information 308. The communication device 304 is a wireless transceiver for communicating with another apparatus including the management apparatus 104 through the communication network 120.

The GPS receiver 306 receives GPS radio waves from a GPS satellite and generates positional data indicating the current position (e.g., latitude and longitude) of the pickup or delivery robot 102.

The processing device 300 is, for example, a computer including a processor such as a CPU. The processing device 300 may be a component including a ROM in which a program is written, an RAM for temporarily storing data, and the like.

The processing device 300 then includes a movement control section 320, an SOC measurement section 322, a pickup or delivery management section 324, a deposit information obtaining section 326, a notification section 328, and a replacement detection section 330 as functional elements or functional units.

These functional elements included in the processing device 300 may be implemented, for example, by executing a program by the processing device 300 that is a computer. It is to be noted that it is possible to store the computer program described above in any computer-readable storage medium. Instead of this, it is also possible to configure all or a portion of the above-described functional elements included in the processing device 300 by using hardware including one or more electronic circuit parts.

The movement control section 320 controls the drive motors 202 to cause the pickup or delivery robot 102 to travel on the basis of positional data related to the current position obtained from the GPS receiver 306 and the map information 308 stored by the storage device 302. Specifically, the movement control section 320 receives a pickup or delivery instruction from the management apparatus 104 by using the communication device 304 and saves the pickup or delivery instruction in the storage device 302. The pickup or delivery instruction includes positional information related to at least one destination that is a pickup or delivery place, the designation of an operation at the destination, and the designation of a moving route for returning to the pickup or delivery center 122 through each destination.

Here, the "designation of an operation" described above may include "delivery designation" indicating that an item is to be delivered and "pickup designation" indicating that an item is to be received. In addition, the delivery designation may include an unlock code of which the management apparatus 104 notifies a portable terminal of a recipient of an item in advance.

The movement control section 320 causes the pickup or delivery robot 102 to travel in accordance with the designation of the moving route included in the received pickup or delivery instruction. Here, the rotation speeds and the rotation directions of the four respective drive motors 202 that drive the four wheels are controlled in accordance with the conventional technology to move forward, turn, and move backward the pickup or delivery robot 102.

The movement control section 320 transmits positional information indicating the current position of the pickup or delivery robot 102 to the management apparatus 104 at predetermined time intervals. In addition, when the pickup or delivery robot 102 arrives at a destination, the movement control section 320 transmits an arrival notification to the pickup or delivery management section 324, the notification section 328, and the management apparatus 104.

When the pickup or delivery robot 102 enters a range of a predetermined distance from the next destination, the movement control section 320 also calculates an expected remaining charge level that is the remaining charge level expected for the pickup or delivery robot 102 reaching the next destination on the basis of the current remaining charge level of the pickup or delivery robot 102 obtained from the SOC measurement section 322 described below, the distance to the next destination, and the amount of power consumed by the pickup or delivery robot 102 per unit traveling distance. Here, it is possible to measure the amount of power consumed per unit traveling distance described above and store the amount of consumed power in the storage device 302 in advance. In addition, the distance to the next destination may be calculated from current positional data from the GPS receiver 306, positional information related to the destination indicated by the pickup or delivery instruction, and the map information 308 stored in the storage device 302.

The SOC measurement section 322 measures the remaining charge level (SOC or State Of Charge) of the detachable battery 110 at predetermined time intervals or per predetermined traveling distance in accordance with the conventional technology. In the present embodiment, the remaining charge level measured by the SOC measurement section 322 is, for example, the amount of available electricity (unit: Ah) remaining in the detachable battery 110. Upon measuring the remaining charge level, the SOC measurement section 322 transmits SOC information indicating the value of the measured remaining charge level to the management apparatus 104.

Upon receiving the arrival notification from the movement control section 320, the pickup or delivery management section 324 performs an operation of receiving or offering an item. Specifically, the pickup or delivery management section 324 refers to the pickup or delivery instruction from the management apparatus 104 saved in the storage device 302 and outputs a message for prompting the recipient of the item to enter the unlock code by using the speaker 210 and/or the display device 208 when the designation of an operation at the current destination at which the pickup or delivery robot 102 arrives is delivery designation.

The recipient uses the touch panel 212 to enter the unlock code of which the recipient is notified in advance by the management apparatus 104 in accordance with the message described above. The pickup or delivery management section 324 verifies the entered unlock code described above with the unlock code included in the delivery designation described above. When these unlock codes match each other, the pickup or delivery management section 324 then instructs the door lock mechanism 214 to unlock the cargo compartment door 204 of the cargo compartment in which an item to be delivered to the recipient is put.

When the recipient takes out the delivered item from the unlocked cargo compartment door 204 and closes the cargo compartment door 204, the pickup or delivery management section 324 then transmits a pickup or delivery completion notification to the management apparatus 104 and the movement control section 320.

In contrast, when the designation of an operation at the current destination at which the pickup or delivery robot 102 arrives is pickup designation, the pickup or delivery management section 324 instructs the door lock mechanism 214 to open the cargo compartment door 204 of a cargo compartment in which no item is stowed. The pickup or delivery management section 324 then outputs a message for prompting the sender of an item to put the item to be checked into the cargo compartment whose cargo compartment door 204 is open by using the speaker 210 and/or the display device 208.

When the sender puts the item to be checked into the unlocked cargo compartment door 204 and closes the cargo compartment door 204, the pickup or delivery management section 324 then transmits a pickup or delivery completion notification to the management apparatus 104, the movement control section 320, and the notification section 328.

The movement control section 320 that receives the pickup or delivery completion notification from the pickup or delivery management section 324 in the pickup or delivery place that is not the depository 112 resumes the movement along the moving route indicated by the pickup or delivery instruction stored in the storage device 302.

The deposit information obtaining section 326 receives depository information 410 stored in a storage device 402 from the management apparatus 104 by using the communication device 304 and obtains information related to the depository 112. The information related to the depository 112 may include positional information (e.g., an address, or longitude and latitude) related to each depository 112 and charge state information indicating the remaining charge level of the deposited detachable battery 110.

When the remaining charge level of the detachable battery 110 attached to the pickup or delivery robot 102 is lower than or equal to the predetermined value, the notification section 328 issues, to the depositary 116 of the depository 112, a replacement request notification for requesting the attached detachable battery 110 to be replaced. In addition, when issuing a replacement request notification, the notification section 328 determines whether or not the remaining charge level of the detachable battery 110 in the depository 112 is higher than or equal to a predetermined value and issues a replacement request notification to the depositary 116 of that depository 112 when the remaining charge level is higher than or equal to the predetermined value.

It is possible to issue a replacement request notification before the pickup or delivery robot 102 reaches the depository 112 and/or when the pickup or delivery robot 102 reaches the depository 112.

The replacement request notification to be issued before the pickup or delivery robot 102 reaches the depository 112 may be issued through the portable terminal 118 of the depositary 116. The replacement request notification issued through the portable terminal 118 may be, for example, a text mail and/or a push notification such as "The pickup or delivery robot will arrive soon. Please replace the battery of the pickup or delivery robot."

Specifically, the notification section 328 determines whether or not the next destination is the depository 112 on the basis of positional information related to the next destination indicated by the pickup or delivery instruction, and positional information and charge state information related to each depository 112 obtained by the deposit information obtaining section 326. In addition, when the next destination is the depository 112, the notification section 328 determines whether or not the remaining charge level of the detachable battery 110 deposited in the depository 112 is higher than or equal to the predetermined value.

When the next destination indicated by the pickup or delivery instruction is the depository 112, the expected remaining charge level at the next destination calculated by the movement control section 320 is lower than or equal to a predetermined value, and the remaining charge level of the detachable battery 110 deposited in the depository 112 is higher than or equal to the predetermined value, the notification section 328 then transmits the replacement request notification described above to the portable terminal 118 of the depositary 116 of that depository 112.

It is to be noted that it is sufficient if the place to which the replacement request notification described above is transmitted is a terminal device owned by the depositary 116, but the place to which the replacement request notification is transmitted is not limited to the portable terminal 118. Such a terminal device may include a personal computer or the like that is not portable.

The replacement request notification to be issued when the pickup or delivery robot 102 reaches the depository 112 is issued to the depositary 116 of that depository 112 through that pickup or delivery robot 102. Specifically, the notification section 328 outputs a replacement request notification such as "Please replace the battery" as a voice message from the speaker 210 and/or a text message displayed on the display device 208. The voice message and/or the text message may include a wording, for example, the name of the depositary 116 or a pronoun such as "Mr. or Ms. Depositary" indicating that the notified person is the depositary 116. In addition, the replacement request notification may include information related to a method for replacing the detachable battery in the pickup or delivery robot 102. In addition, the replacement method described above may include information related to a position in the pickup or delivery robot 102 at which the detachable battery 110 is mounted, or an instruction or a request, for example, to charge the detachable battery 110 pulled out from the pickup or delivery robot 102 with the charger 114 in that depository 112.

More specifically, when receiving an arrival notification from the movement control section 320, the notification section 328 determines whether or not the current destination at which the pickup or delivery robot 102 arrives is the depository 112 on the basis of current positional information from the GPS receiver 306 and positional information related to each depository 112 obtained by the deposit information obtaining section 326.

In addition, when the current destination at which the pickup or delivery robot 102 arrives is the depository 112, the notification section 328 determines whether or not the remaining charge level of the detachable battery 110 deposited in the depository 112 is higher than or equal to the predetermined value on the basis of charge state information related to that depository 112 obtained by the deposit information obtaining section 326.

When the current destination at which the pickup or delivery robot 102 arrives is the depository 112, the current remaining charge level of the pickup or delivery robot 102 measured by the SOC measurement section 322 is lower than or equal to the predetermined value, and the remaining charge level of the detachable battery 110 deposited in that depository 112 is higher than or equal to the predetermined value, the notification section 328 then outputs the replacement request notification described above. In this case, when the current destination at which the pickup or delivery robot 102 arrives is the depository 112 that is a pickup or delivery place, the notification section 328 receives a pickup or delivery completion notification from the pickup or delivery management section 324 and then outputs the replacement request notification described above.

In addition, when not outputting the replacement request notification, the notification section 328 transmits, to the movement control section 320, a notification indicating that replacement is unnecessary. The movement control section 320 that receives the notification indicating that replacement is unnecessary resumes the movement along the moving route indicated by the pickup or delivery instruction stored in the storage device 302.

In contrast, when outputting the replacement request notification, the notification section 328 transmits a replacement standby instruction to the replacement detection section 330 and the movement control section 320.

The depositary 116 who receives the replacement request notification pulls out the detachable battery 110 attached to that pickup or delivery robot 102 from the battery socket 206 provided to the packing box 108 of the pickup or delivery robot 102 for replacement with the detachable battery 110 connected to the charger 114.

Upon receiving the replacement standby instruction from the notification section 328, the replacement detection section 330 detects that the detachable battery 110 is replaced. Specifically, for example, when detecting that a voltage supplied from the battery socket 206 temporarily becomes zero and then restores to a level higher than or equal to a predetermined value by using a voltage sensor (not illustrated) provided to the battery socket 206, the replacement detection section 330 determines that the detachable battery 110 is replaced. In addition, when not detecting the replacement of the detachable battery 110 within a predetermined time, the replacement detection section 330 determines that the replacement is not carried out.

When detecting that the detachable battery 110 is replaced, the replacement detection section 330 transmits a replacement completion notification to the management apparatus 104 and the movement control section 320. Alternatively, when not detecting the replacement of the detachable battery 110 within the predetermined time, the replacement detection section 330 transmits a replacement incompletion notification to the management apparatus 104 and the movement control section 320.

The movement control section 320 that receives the replacement completion notification or the replacement incompletion notification resumes the movement along the moving route indicated by the pickup or delivery instruction stored in the storage device 302.

[3. Configuration of Management Apparatus]

Figure 4:
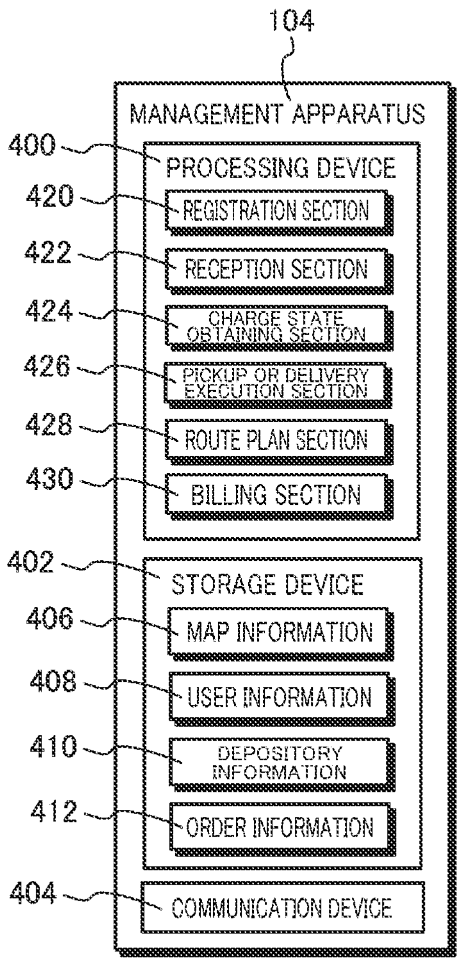
FIG. 4 is a diagram illustrating a configuration of a management apparatus included in the robot pickup or delivery system.

FIG. 4 is a diagram illustrating a configuration of the management apparatus 104. The management apparatus 104 includes a processing device 400, the storage device 402, and a communication device 404. The communication device 404 is a transceiver for performing wired communication or wireless communication with another apparatus including the pickup or delivery robot 102 through the communication network 120.

The storage device 402 includes, for example, a volatile and/or non-volatile semiconductor memory, and/or a hard disk device, and/or the like, and stores map information 406, user information 408, the depository information 410, and order information 412. The user information 408 includes information related to the address, the name, or the like of a registration user who uses the item pickup or delivery service provided by the robot pickup or delivery system 100. The depository information 410 includes positional information related to each depository 112, charge state information indicating the remaining charge level of the deposited detachable battery 110, and information related to the depositary 116. The information related to the depositary 116 may include the registration ID of that depositary 116 as a registration user and access information (such as a mail address) related to the portable terminal 118. The order information 412 is saved in the storage device 402 by a reception section 422 described below.

The processing device 400 is, for example, a computer including a processor such as a CPU. The processing device 400 may be a component including a ROM in which a program is written, an RAM for temporarily storing data, and the like.

The processing device 400 includes a registration section 420, the reception section 422, a charge state obtaining section 424, a pickup or delivery execution section 426, a route plan section 428, and a billing section 430 as functional elements or functional units.

These functional elements included in the processing device 400 may be implemented, for example, by executing a program by the processing device 400 that is a computer. It is to be noted that it is possible to store the computer program described above in any computer-readable storage medium. Instead of this, it is also possible to configure all or a portion of the above-described functional elements included in the processing device 400 by using hardware including one or more electronic circuit parts.

On the basis of a request from an applicant who wishes to use the item pickup or delivery service, the registration section 420 registers the applicant as a user of the robot pickup or delivery system 100. The registered user is a registration user. Specifically, the registration section 420 receives registration information including the name of the applicant, the address of the residence, the presence or absence of permission to use that residence as the depository 112, billing destination information such as a credit card number, and the like from a portable terminal of that applicant by using the communication device 404. The registration section 420 then generates a user ID specific to the received registration information and transmits the user ID to the portable terminal of the applicant described above. In addition, the registration section 420 associates the user ID and the received registration information described above and saves the user ID and the registration information in the storage device 402 as the user information 408.

In addition, the registration section 420 generates the depository information 410 on the basis of registration information related to a registration user of registration users who agrees to use the residence as the depository 112 in user registration and saves the depository information 410 in the storage device 402. In the depository information 410, the residences of those registration users are saved as pieces of positional information related to the depositories 112 and the names of those registration users and pieces of information related to portable terminals are saved as pieces of information related to the depositaries 116 of the corresponding depositories 112.

The detachable battery 110 and the charger 114 are distributed to the registration user who agrees to use the residence as the depository 112, for example, from an administrator who runs the robot pickup or delivery system 100. That registration user installs the distributed charger 114 in the residence, connects the distributed detachable battery 110 to the charger 114, and keeps the detachable battery 110.

The reception section 422 receives a pickup or delivery request (order) of an item from a terminal device (not illustrated) in a store of the administrator who runs the robot pickup or delivery system 100 or a portable terminal of a client who wishes to use the item pickup or delivery service. The reception section 422 saves the received pickup or delivery request in the storage device 402 as the order information 412. The order information 412 includes an order ID, client information, the designation of an operation indicating which of pickup or delivery is applied, the identification ID of an item in the case of delivery, the designation of the pickup or delivery place of the item, and the designation of a pickup or delivery date. The "client information" described above includes information related to the billing destination such as the name, the address, or the credit card of a client, and when the client is a registration user, the "client information" may include the registration ID of that person. In addition, the "designation of the pickup or delivery place" described above may include the name or the address of the recipient or the sender of an item.

The charge state obtaining section 424 obtains the remaining charge level of the detachable battery 110 deposited in each depository 112 at predetermined time intervals. Specifically, the charge state obtaining section 424 obtains information related to the remaining charge level of the detachable battery 110 deposited in each depository 112 from the charger 114 in the depository 112. The charge state obtaining section 424 associates the obtained information related to the remaining charge level with the corresponding depository 112 and saves the information related to the remaining charge level in the depository information 410 as the charge state information.

The pickup or delivery execution section 426 executes the pickup or delivery request received by the reception section 422 by using the pickup or delivery robot 102 on the basis of the order information 412. The pickup or delivery execution section 426 extracts a pickup or delivery request whose designated pickup or delivery date arrives on the basis of the order information 412. The pickup or delivery execution section 426 transmits the extracted pickup or delivery request described above to the route plan section 428 and causes the route plan section 428 to plan a moving route for the pickup or delivery robot 102 to perform an operation of pickup or delivery for the pickup or delivery place indicated by the pickup or delivery request described above.

In addition, when the designation of an operation indicated by the extracted pickup or delivery request described above is delivery designation, the pickup or delivery execution section 426 generates an unlock code of the cargo compartment door 204 that is set in the pickup or delivery robot 102. The pickup or delivery execution section 426 generates a pickup or delivery instruction including positional information related to a destination including the pickup or delivery place, the designation of an operation at the destination, and the designation of a moving route for returning to the pickup or delivery center 122 through each destination on the basis of the extracted pickup or delivery request described above, the generated unlock code described above, and the moving route planned by the route plan section 428. The pickup or delivery execution section 426 then transmits the generated pickup or delivery instruction to the loading device 124 in the pickup or delivery center 122 and the pickup or delivery robot 102.

The route plan section 428 plans a moving route for the pickup or delivery robot 102 to perform an operation of pickup or delivery for the pickup or delivery place in accordance with the instruction from the pickup or delivery execution section 426. Specifically, the route plan section 428 plans a moving route for the pickup or delivery robot 102 to move to a pickup or delivery place that is a destination after the departure from the pickup or delivery center 122 and then return to the pickup or delivery center 122. The pickup or delivery place may include a pickup or delivery place that is the depository 112 and a pickup or delivery place that is not the depository 112. The moving route may include even the depository 112 that is not a pickup or delivery place as a destination in accordance with the remaining charge level of the pickup or delivery robot 102.

When the moving route includes the depository 112 that is not a pickup or delivery place, the route plan section 428 plans a moving route for dropping in, as a destination, at the depository 112 in which the detachable battery 110 is deposited whose remaining charge level is higher than or equal to the predetermined value.

In addition, the route plan section 428 selects the depository 112 to drop in at on the moving route and decides the order to drop in at the selected depository 112 and a pickup or delivery place to drop in at on the basis of the remaining charge level of the pickup or delivery robot 102, positional information related to the depository 112 and information related to the remaining charge level of the deposited detachable battery 110, and the amount of power consumed by the pickup or delivery robot 102 per unit traveling distance.

In addition, the route plan section 428 obtains information related to the remaining charge level of the pickup or delivery robot 102 from that pickup or delivery robot 102 at the predetermined time intervals. When the remaining charge level of the pickup or delivery robot 102 becomes lower than or equal to the predetermined value during the movement, the route plan section 428 then changes the moving route to drop in at the depository 112. The depository 112 described above may be, for example, the nearest depository from the current position of the pickup or delivery robot 102 among the depositories 112 in which the detachable batteries 110 are charged up to the remaining charge levels each higher than or equal to the predetermined value.

The billing section 430 bills a client of the pickup or delivery service of an item that is a package for the pickup or delivery service. Specifically, when receiving a pickup or delivery completion notification from the pickup or delivery robot 102, the billing section 430 performs a billing process for a client of the pickup or delivery request for the pickup or delivery completion notification in accordance with the conventional technology.

In addition, when the detachable battery 110 attached to the pickup or delivery robot 102 is replaced in the depository 112, the billing section 430 provides an incentive to the depositary 116 of that depository 112. Specifically, when receiving a replacement completion notification from the pickup or delivery robot 102, the billing section 430 provides an incentive to a registration user who is the depositary 116 for the replacement completion notification. The incentive may be, for example, money or a point having a monetary value.

More specifically, the billing section 430 identifies the depository 112 for that replacement completion notification in which the battery is replaced, and the registration ID of the depositary 116 of that depository 112 on the basis of positional information related to the replacement place included in the received replacement completion notification described above, and positional information related to the depository 112 and information related to the depositary 116 stored in the storage device 402.

The billing section 430 then saves information (e.g., the value of the number of points or the amount of money provided as the incentive) related to the provided incentive in the user information 408 related to the registration user having the above-described identified registration ID stored in the storage device 402.

The billing section 430 is capable of providing money to the corresponding registration user on the basis of the saved information related to the incentive described above in accordance with the conventional technology or making, when that registration user makes a pickup or delivery request, a discount on the bill for that pickup or delivery request.

[4. Operation of Robot Pickup or Delivery System]

Next, a processing procedure of the robot pickup or delivery system 100 in a pickup or delivery operation will be described in accordance with the flowcharts illustrated in FIGS. 5 and 6. This process is started by the pickup or delivery execution section 426 of the management apparatus 104 when the pickup or delivery date designated by a pickup or delivery request arrives.

Figure 5:
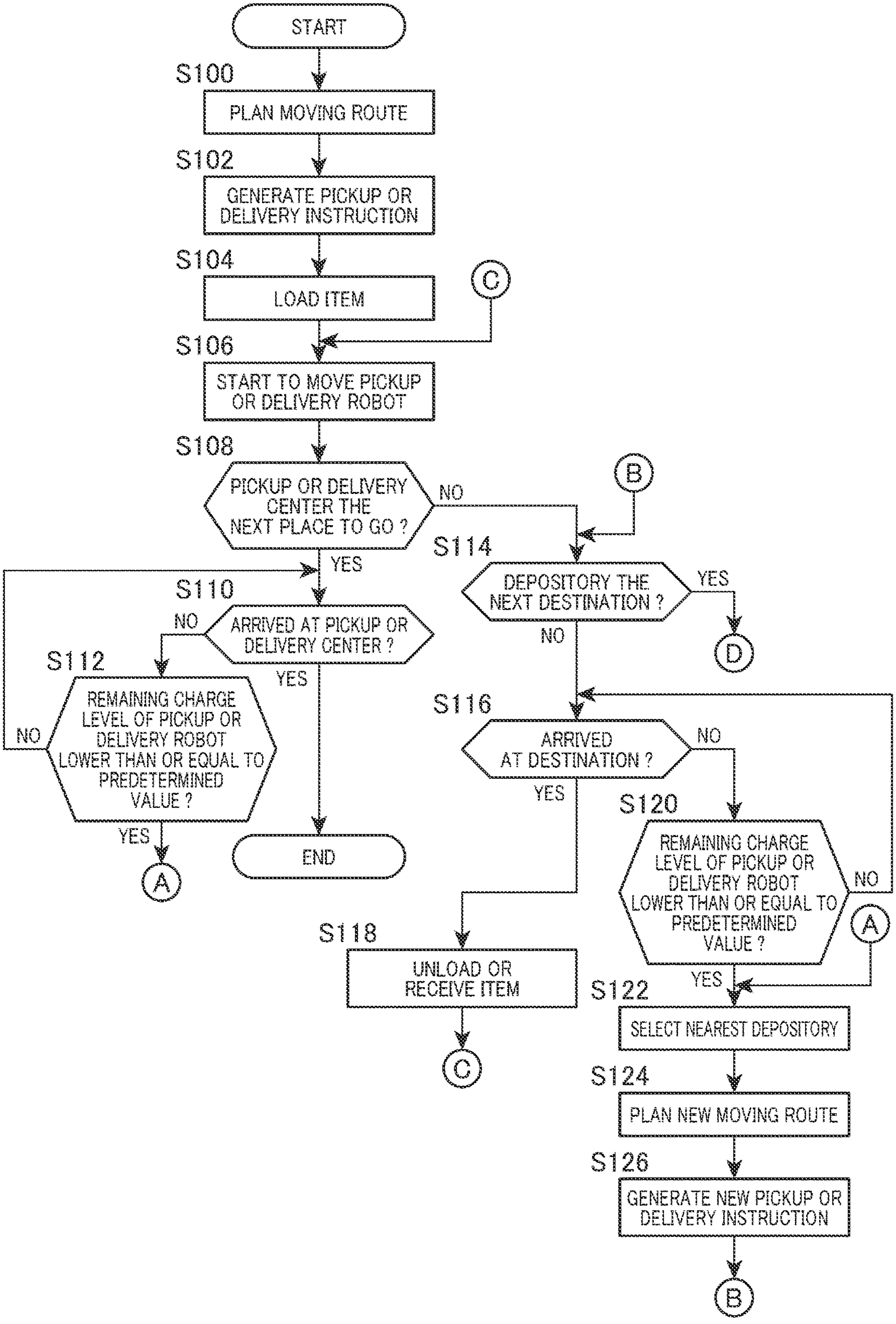
FIG. 5 is a flowchart illustrating a procedure of a pickup or delivery operation in the robot pickup or delivery system.

In FIG. 5, when the process starts, the route plan section 428 of the management apparatus 104 first plans a moving route for the pickup or delivery robot 102 to execute a pickup or delivery request whose pickup or delivery date arrives in accordance with an instruction from the pickup or delivery execution section 426 (S100). Here, when a plurality of pickup or delivery instructions designate the same pickup or delivery date, the route plan section 428 plans a moving route including the pickup or delivery place indicated by each of those pickup or delivery instructions as a destination.

As described above, the route plan section 428 selects the depository 112 to drop in at on the moving route and decides the order to drop in at the selected depository 112 and a pickup or delivery place to drop in at on the basis of the remaining charge level of the pickup or delivery robot 102, the positional information related to the depository 112, and the like. This allows the moving route to include, as destinations, a pickup or delivery place that is not the depository 112, a pickup or delivery place that is the depository 112, and the depository 112 that is not a pickup or delivery place. In addition, the moving route includes the pickup or delivery center 122 as the final place to go.

Next, the pickup or delivery execution section 426 of the management apparatus 104 generates a pickup or delivery instruction including the information related to the moving route planned by the route plan section 428 (S102). The pickup or delivery execution section 426 transmits the generated pickup or delivery instruction to the loading device 124 in the pickup or delivery center 122 and the pickup or delivery robot 102. The loading device 124 loads the pickup or delivery robot 102 with items that are packages on the basis of the received pickup or delivery instruction (S104).

Subsequently, the movement control section 320 of the pickup or delivery robot 102 starts to move the pickup or delivery robot 102 along the moving route indicated by the received pickup or delivery instruction (S106). Upon starting the movement, the movement control section 320 of the pickup or delivery robot 102 determines whether or not the next place to go along the moving route is the pickup or delivery center 122 (S108). When the next place to go is not the pickup or delivery center 122 (NO in S108), the movement control section 320 then determines whether or not the next destination that is a place to go is the depository 112 (S114).

When the next destination is not the depository 112, that is, when the next destination is a pickup or delivery place that is not the depository 112 (NO in S114), the movement control section 320 determines whether or not the pickup or delivery robot 102 arrives at the next destination on the basis of current positional information from the GPS receiver 306 and positional information related to the next destination indicated by the pickup or delivery instruction (S116). When the pickup or delivery robot 102 arrives at the next destination, that is, the pickup or delivery place that is not the depository 112 (YES in S116), the pickup or delivery management section 324 of the pickup or delivery robot 102 then unloads an item to be delivered and/or receives an item to be picked up in accordance with the designation of an operation at that destination indicated by the pickup or delivery instruction (S118). After that, the movement control section 320 returns to step S106 and resumes moving the pickup or delivery robot 102 along the moving route indicated by the pickup or delivery instruction.

In contrast, when the pickup or delivery robot 102 still does not arrive at the destination in step S116 (NO in S116), the route plan section 428 of the management apparatus 104 determines whether or not the remaining charge level of the pickup or delivery robot 102 is lower than or equal to a predetermined value on the basis of SOC information received from the pickup or delivery robot 102 at predetermined time intervals or every predetermined traveling distance (S120).

When the remaining charge level of the pickup or delivery robot 102 is lower than or equal to the predetermined value (YES in S120), the route plan section 428 then selects, as the next destination, the nearest depository 112 from the current position of the pickup or delivery robot 102 in which the detachable battery 110 is deposited whose remaining charge level is higher than or equal to the predetermined value on the basis of the current positional information related to the pickup or delivery robot 102 received from the pickup or delivery robot 102 at the predetermined time intervals and the depository information 410 stored in the storage device 402 (S122).

Subsequently, the route plan section 428 plans a new moving route including the selected depository 112 described above as the next destination (S124). The pickup or delivery execution section 426 generates a new pickup or delivery instruction on the basis of information related to the new moving route described above (S126) and transmits the generated new pickup or delivery instruction to the pickup or delivery robot 102. After that, the robot pickup or delivery system 100 returns to step S114 and repeats the process. This makes it possible to move the pickup or delivery robot 102 to the nearest depository 112 and request the depositary 116 to replace the detachable battery 110 in the depository 112 when the remaining charge level of the pickup or delivery robot 102 becomes lower than or equal to the predetermined value before the arrival at the next destination.

In contrast, when the remaining charge level of the pickup or delivery robot 102 is not lower than or equal to the predetermined value in step S120 (NO in S120), the robot pickup or delivery system 100 returns to step S116 and continues moving the pickup or delivery robot 102.

Meanwhile, when the next place to go is the pickup or delivery center 122 in step S108 (YES in S108), the movement control section 320 determines whether or not the pickup or delivery robot 102 arrives at the pickup or delivery center 122 (S110). When the pickup or delivery robot 102 arrives at the pickup or delivery center (YES in S110), the pickup or delivery operation then ends.

In contrast, when the pickup or delivery robot 102 does not arrive at the pickup or delivery center (NO in S110), the route plan section 428 of the management apparatus 104 determines whether or not the remaining charge level of the pickup or delivery robot 102 is lower than or equal to the predetermined value as in step S120 described above (S112).

When the remaining charge level of the pickup or delivery robot 102 is lower than or equal to the predetermined value (YES in S112), the process then transitions to step S122, and the management apparatus 104 generates a new pickup or delivery instruction including the moving route including the nearest depository 112 as the next destination and transmits the new pickup or delivery instruction to the pickup or delivery robot 102.

In contrast, when the remaining charge level of the pickup or delivery robot 102 is not lower than or equal to the predetermined value in step S112 (NO in S112), the robot pickup or delivery system 100 returns to step S110 and continues moving the pickup or delivery robot 102 toward the pickup or delivery center 122.

Figure 6:
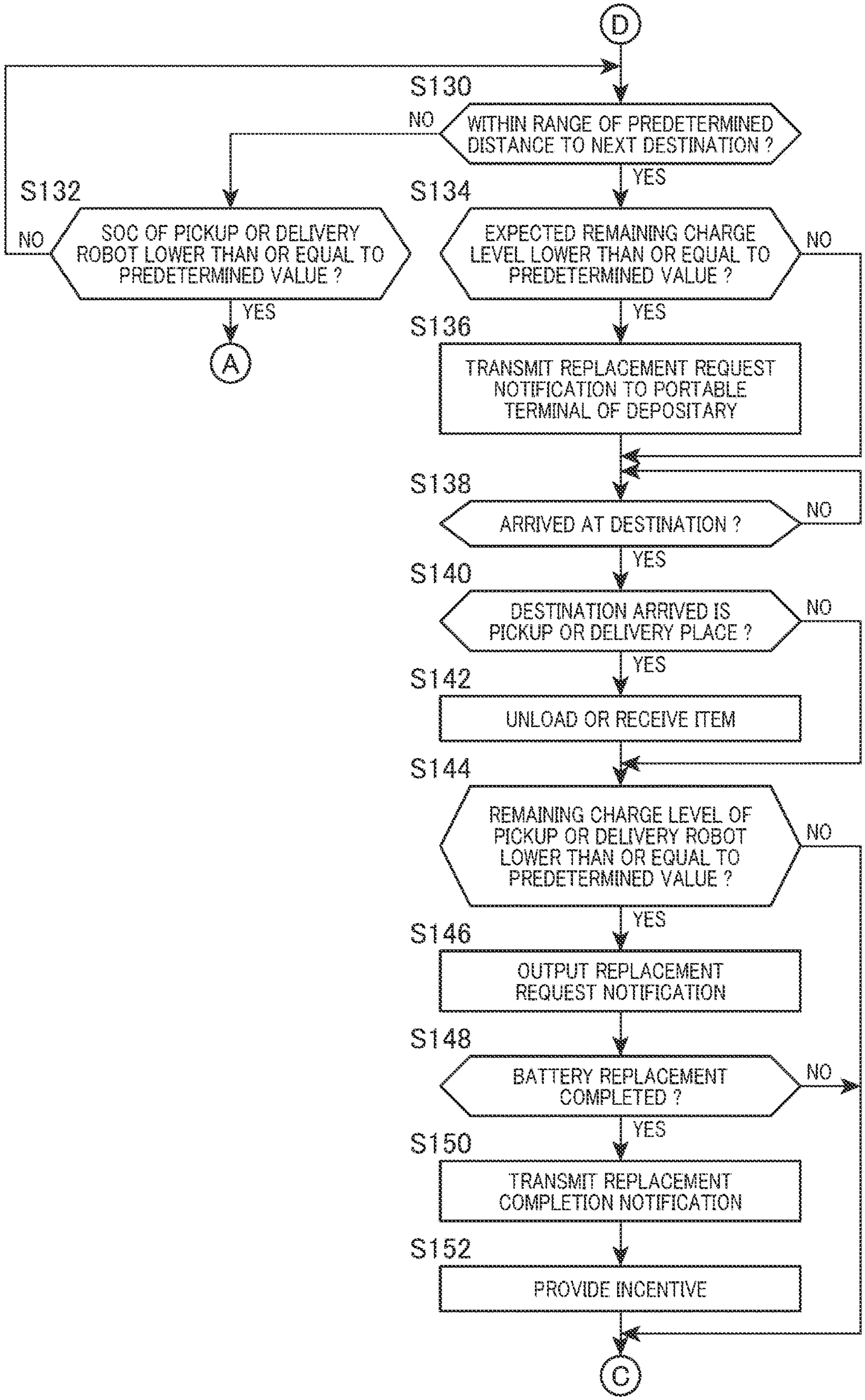
FIG. 6 is a flowchart illustrating the procedure of the pickup or delivery operation in the robot pickup or delivery system.

In contrast, when the next destination is the depository 112 in step S114, that is, when the next destination is a pickup or delivery place that is the depository 112 or the depository 112 that is not a pickup or delivery place (YES in S114), the robot pickup or delivery system 100 executes step S130 illustrated in FIG. 6. In other words, the notification section 328 of the pickup or delivery robot 102 determines whether or not the pickup or delivery robot 102 enters a range of a predetermined distance to the next destination on the basis of the current positional information from the GPS receiver 306 and the positional information related to the next destination indicated by the pickup or delivery instruction (S130).

When the pickup or delivery robot 102 does not reach the range of the predetermined distance to the next destination (NO in S130), the route plan section 428 of the management apparatus 104 then determines whether or not the remaining charge level of the pickup or delivery robot 102 is lower than or equal to the predetermined value as in step S120 described above (S132).

When the remaining charge level of the pickup or delivery robot 102 is lower than or equal to the predetermined value (YES in S132), the process then transitions to step S122 of FIG. 5, and the management apparatus 104 generates a new pickup or delivery instruction including the moving route including the nearest depository 112 as the next destination and transmits the new pickup or delivery instruction to the pickup or delivery robot 102.

In contrast, when the remaining charge level of the pickup or delivery robot 102 is not lower than or equal to the predetermined value in step S132 (NO in S132), the robot pickup or delivery system 100 returns to step S130 and continues moving the pickup or delivery robot 102.

In contrast, when the pickup or delivery robot 102 enters the range of the predetermined distance to the next destination in step S130 (YES in S130), the movement control section 320 calculates the expected remaining charge level of the pickup or delivery robot 102 reaching the next destination and the notification section 328 determines whether or not the calculated expected remaining charge level is lower than or equal to a predetermined value (S134).

When the expected remaining charge level is lower than or equal to the predetermined value (YES in S134), the notification section 328 then transmits a replacement request notification to the portable terminal 118 of the depositary 116 of the depository 112 that is the next destination for requesting the detachable battery 110 attached to the pickup or delivery robot 102 to be replaced (S136).

Subsequently, the movement control section 320 of the pickup or delivery robot 102 determines whether or not the pickup or delivery robot 102 arrives at the destination (S138). In contrast, when the expected remaining charge level of the pickup or delivery robot 102 reaching the next destination is not lower than or equal to the predetermined value in step S134 (NO in S134), the replacement request notification is not issued to the portable terminal 118 of the depositary 116 by the notification section 328, but it is determined in step S138 whether the pickup or delivery robot 102 arrives at the destination.

Subsequently, when it is determined in step S138 that the pickup or delivery robot 102 does not arrive at the destination (NO in S138), the movement control section 320 returns to step S138 and continues moving the pickup or delivery robot 102. In contrast, when the pickup or delivery robot 102 arrives at the destination (YES in S138), the pickup or delivery management section 324 of the pickup or delivery robot 102 refers to the pickup or delivery instruction and determines whether or not the destination at which the pickup or delivery robot 102 arrives is a pickup or delivery place (S140).

When the destination at which the pickup or delivery robot 102 arrives is a pickup or delivery place (YES in S140), the pickup or delivery management section 324 then unloads an item to be delivered and/or receives an item to be picked up in accordance with the designation of an operation at that destination indicated by the pickup or delivery instruction as in step S118 (S142). Subsequently, the notification section 328 determines whether or not the current remaining charge level of the pickup or delivery robot 102 is lower than or equal to the predetermined value on the basis of information from the SOC measurement section 322 (S144).

In contrast, the destination at which the pickup or delivery robot 102 arrives is not a pickup or delivery place in step S140 (NO in S140), the pickup or delivery management section 324 does not unload and receive an item, but determines the remaining charge level in step S144.

When the current remaining charge level of the pickup or delivery robot 102 is lower than or equal to the predetermined value in step S144 (YES in S144), the notification section 328 uses the speaker 210 and/or the display device 208 of the pickup or delivery robot 102 to output a replacement request notification for requesting the detachable battery 110 attached to the pickup or delivery robot 102 to be replaced (S146). This causes the depositary 116 or the like of that depository 112 to replace the detachable battery 110 described above.

Subsequently, the replacement detection section 330 of the pickup or delivery robot 102 determines whether or not the detachable battery 110 of the pickup or delivery robot 102 is replaced (S148). When the detachable battery 110 described above is replaced (YES in S148), the replacement detection section 330 then transmits, to the management apparatus 104, a replacement completion notification indicating that the detachable battery 110 is replaced (S150).

The billing section 430 of the management apparatus 104 provides an incentive to the depositary 116 of the depository 112 that is the destination described above in which the battery is replaced in accordance with the reception of the replacement completion notification described above (S152). As described above, the incentive described above may be provided by the billing section 430 saving information (such as the number of points) related to the incentive in the user information 408 related to the depositary 116 described above who is a registration user stored in the storage device 402.

After the incentive is provided in step S152, the process of the robot pickup or delivery system 100 returns to step S106 in FIG. 5 and the movement control section 320 of the pickup or delivery robot 102 resumes moving the pickup or delivery robot 102.

In contrast, when the remaining charge level of the pickup or delivery robot 102 is not lower than or equal to the predetermined value in step S144 (NO in S144) and when the detachable battery 110 is not replaced in step S148 (NO in S148), the process returns to step S106 in FIG. 5 as it is and the movement of the pickup or delivery robot 102 is resumed.

[5. Other Implementations]

In the robot pickup or delivery system 100, a portion of the functional elements included in the processing device 300 of the pickup or delivery robot 102 may be included in the processing device 400 of the management apparatus 104 and a portion of the functional elements included in the processing device 300 may be included in the processing device 400.

For example, the function of the route plan section 428 included in the processing device 400 of the management apparatus 104 may be included in the processing device 300 of the pickup or delivery robot 102. In addition, the function of the notification section 328 included in the processing device 300 of the pickup or delivery robot 102 may be included in the processing device 400 of the management apparatus 104.

In addition, in the pickup or delivery robot 102 described above, the notification section 328 obtains information related to the remaining charge level of the detachable battery 110 described above from charge state information included in the depository information 410 obtained by the deposit information obtaining section 326 from the management apparatus 104 when determining whether or not the remaining charge level of the detachable battery 110 deposited in the depository 112 is higher than or equal to the predetermined value. Instead of this, the notification section 328 is capable of obtaining information related to the remaining charge level of the detachable battery 110 connected to the charger 114 in the depository 112 and deposited in the depository 112 directly from the charger 114.

In addition, the pickup or delivery service done by the robot pickup or delivery system 100 is not limited to the home delivery service according to the embodiment described above, but may be any service for picking up or delivering an item. For example, the pickup or delivery service done by the robot pickup or delivery system 100 may be a service for delivering and/or picking up products, semi-finished products, and/or parts to and/or from a plurality of workplaces in a factory. In this case, a workplace that uses the pickup or delivery service, and an operator or a supervisor in the workplace may be the depository 112 that includes the charger 114 and has the detachable battery 110 deposited therein, and the depositary 116 of the depository 112.

Alternatively, the pickup or delivery service done by the robot pickup or delivery system 100 may be, for example, a purchase agency service that may be used by an elderly person or the like. In this case, an item carried by the pickup or delivery robot 102 is a purchase designated by a client and pickup or delivery places are the client and a goods store such as a supermarket designated by the client. In addition, the depository 112 may be the residence of the client and/or the goods store and the depositary 116 may be the client and/or goods store staff.

In addition, the pickup or delivery robot 102 included in the robot pickup or delivery system 100 is assumed to be a vehicle that travels on the ground in the embodiment described above, but may be any mobile object capable of transporting an item. For example, the pickup or delivery robot 102 may be a flying object such as a drone that may fly in the air to transport an item or may be a mobile object that moves on the water or under the water to pick up or deliver an item from or to a vessel or the like which is a pickup or delivery place or the depository 112.

In addition, a package of the pickup or delivery robot 102 is an item that a person is able to take out with a hand in the embodiment described above, but may be liquid or gas depending on the structure of a packing box (storage box) included in the pickup or delivery robot 102. For example, the pickup or delivery robot 102 may be a mobile object that uses fuel such as biofuel for an internal combustion engine as a package and supplies a designated amount of fuel to each of a plurality of pickup or delivery places.

In addition, the depository 112 is the residence of a registration user in the embodiment described above, but may be any place or structure as long as the place or the structure includes the charger 114 and allows the charged detachable battery 110 to be deposited. For example, a pickup or delivery place of a package may be a vehicle including an internal combustion engine, and the depository 112 and the depositary 116 may be that vehicle and a driver of the vehicle. The vehicle that is the depository 112 may include the charger 114, operate the charger 114 by using, for example, another battery charged with electricity generated by the internal combustion engine, and keep the detachable battery 110 charged by the charger 114. In this case, a pickup or delivery request received by the management apparatus 104 may include the designation of pickup or delivery time and a parking place of the vehicle described above at that pickup or delivery time.

[6. Configurations Supported by Embodiment Above and/or Other Implementations above]

(Configuration 1) A robot pickup or delivery system in which a pickup or delivery robot picks up or delivers a package, the pickup or delivery robot including a detachable battery as a power source and a carrier to be loaded with a package, the robot pickup or delivery system including: a storage device configured to store information related to a depository of the detachable battery; and a notification section configured to issue a notification to a depositary with whom the detachable battery is deposited in the depository when a remaining charge level of the detachable battery attached to the pickup or delivery robot is lower than or equal to a predetermined value, the notification being for requesting the attached detachable battery to be replaced.

The robot pickup or delivery system according to Configuration 1 makes it possible to achieve high delivery efficiency while avoiding an increase in delivery time, traveling distance, and/or power consumption of the pickup or delivery robot because the pickup or delivery robot does not have to move to a specific place provided with a special charger even when the remaining charge level of the attached detachable battery becomes insufficient during pickup or delivery.

(Configuration 2) The robot pickup or delivery system according to Configuration 1, in which the notification includes information related to a method for replacing the detachable battery in the pickup or delivery robot.

The robot pickup or delivery system according to Configuration 2 makes it possible to help the depositary in smoothly replacing the detachable battery.

(Configuration 3) The robot pickup or delivery system according to Configuration 1 or 2, in which the notification section issues the notification of the request to the depositary through a terminal device of the depositary before the pickup or delivery robot reaches the depository.

The robot pickup or delivery system according to Configuration 3 makes it possible to have the battery replaced in the depository more reliably in shorter time because the depositary is requested in advance to replace the battery.

(Configuration 4) The robot pickup or delivery system according to any of Configurations 1 to 3, in which the notification section outputs the notification when the pickup or delivery robot reaches the depository, the notification being for requesting the detachable battery to be replaced.

The robot pickup or delivery system according to Configuration 4 makes it possible to have the battery replaced more reliably because the battery is requested to be replaced in the depository.

(Configuration 5) The robot pickup or delivery system according to any of Configurations 1 to 4, including a charge state obtaining section configured to obtain information related to a remaining charge level of the detachable battery in the depository, in which, when the remaining charge level of the detachable battery in the depository is higher than or equal to a predetermined value, the notification section outputs a notification for requesting the detachable battery to be replaced in the depository.

The robot pickup or delivery system according to Configuration 5 makes it possible to prevent the detachable battery attached to the pickup or delivery robot from being replaced with a detachable battery having a low remaining charge level.

(Configuration 6) The robot pickup or delivery system according to any of Configurations 1 to 5, in which the depository includes a place serving as a delivery place and/or a pickup place of the package.

The robot pickup or delivery system according to Configuration 6 makes it possible to further reduce an increase in delivery time, traveling distance, and/or power consumption caused by replacing the detachable battery and further increase delivery efficiency because the detachable battery of the pickup or delivery robot is replaced in a depository that is a pickup or delivery place of a package.

(Configuration 7) The robot pickup or delivery system according to Configuration 6, including: a charge state obtaining section configured to obtain information related to a remaining charge level of the detachable battery in the depository; and a route plan section configured to plan a moving route for the pickup or delivery robot to drop in at a delivery place and/or a pickup place of the package, in which the route plan section plans the moving route to drop in at the depository of the detachable battery whose remaining charge level is higher than or equal to a predetermined value.

The robot pickup or delivery system according to Configuration 7 makes it possible to reduce the number of times the detachable battery is replaced and further increase the delivery efficiency because a moving route is planned while avoiding a depository in which a detachable battery having a low remaining charge level is deposited.

(Configuration 8) The robot pickup or delivery system according to Configuration 7, in which the route plan section decides the depository to drop in at on the moving route, and an order to drop in at the depository and the delivery place and/or the pickup place on the basis of the remaining charge level of the detachable battery attached to the pickup or delivery robot, positional information related to the depository and the remaining charge level of the detachable battery deposited in each of the depositories, and an amount of power consumed by the pickup or delivery robot per unit traveling distance.

The robot pickup or delivery system according to Configuration 8 makes it possible to reduce moving distance and the number of times the battery is replaced and further increase the delivery efficiency because it is possible to appropriately select a battery replacement timing and a replacement place for the pickup or delivery robot in a pickup or delivery operation.

(Configuration 9) The robot pickup or delivery system according to Configuration 7 or 8, in which, when the remaining charge level of the detachable battery attached to the pickup or delivery robot becomes lower than or equal to a predetermined value during movement, the route plan section changes the moving route to drop in at the depository.

The robot pickup or delivery system according to Configuration 9 makes it possible to replace the battery in the nearest depository and secure power for moving the pickup or delivery robot even when the actual power consumption of the detachable battery in the pickup or delivery robot is greater than power consumption expected in planning a moving route, for example, because of regularities of a traveling road or the like.

(Configuration 10) The robot pickup or delivery system according to Configuration 5 or any of Configurations 7 to 9, in which a charger to which the detachable battery is connected is distributed to the depository, and the charge state obtaining section obtains information from the charger, the information being related to the remaining charge level of the detachable battery in the depository.

The robot pickup or delivery system according to Configuration 10 makes it possible to easily collect information related to the remaining charge level of the detachable battery deposited in the depository.

(Configuration 11) The robot pickup or delivery system according to any of Configurations 6 to 10, including a billing section configured to issue a bill for a pickup or delivery service of the package, in which, when the detachable battery of the pickup or delivery robot is replaced in the depository, the billing section provides an incentive to the depositary of the depository.

The robot pickup or delivery system according to Configuration 11 makes it possible to motivate the depositary to replace the detachable battery and compensate for cost such as an electricity bill for charging the detachable battery.

(Configuration 12) A pickup or delivery robot to which a detachable battery is attached, the pickup or delivery robot being configured to pick up or deliver a package, the pickup or delivery robot including: a deposit information obtaining section configured to obtain information related to a depository of the detachable battery; and a notification section configured to issue a notification to a depositary with whom the detachable battery is deposited in the depository when a remaining charge level of the attached detachable battery is lower than or equal to a predetermined value, the notification being for requesting the attached detachable battery to be replaced.

The pickup or delivery robot according to Configuration 12 makes it possible to achieve high delivery efficiency while avoiding an increase in delivery time, traveling distance, and/or power consumption because the pickup or delivery robot does not have to move to a specific place provided with a special charger to which the pickup or delivery robot docks the pickup or delivery robot itself for charging even when the remaining charge level of the attached detachable battery becomes insufficient during pickup or delivery.

REFERENCE SIGNS LIST

100 robot pickup or delivery system
102 pickup or delivery robot
104 management apparatus
106 item
108 packing box
110 detachable battery
112, **112*a*, 112*b*, 112*c*** depository
114, **114*a*, 114*b*, 114*c*** charger
116, **116*a*, 116*b*, 116*c*** depositary
118, **118*a*, 118*b*, 118*c*** portable terminal
120 communication network
122 pickup or delivery center
124 loading device
200 wheel
202 drive motor

204 cargo compartment door
206 battery socket
208 display device
210 speaker
212 touch panel
214 door lock mechanism
300, 400 processing device
302, 402 storage device
304, 404 communication device
306 GPS receiver
308, 406 map information
320 movement control section
322 SOC measurement section
324 pickup or delivery management section
326 deposit information obtaining section
328 notification section
330 replacement detection section
408 user information
410 depository information
412 order information
420 registration section
422 reception section
424 charge state obtaining section
426 pickup or delivery execution section
428 route plan section
430 billing section

The invention claimed is:

1. A robot pickup or delivery system in which a pickup or delivery robot picks up or delivers a package, the pickup or delivery robot including a detachable battery as a power source and a carrier to be loaded with a package, the robot pickup or delivery system comprising:

a storage device configured to store information related to a depository of the detachable battery;

a notification section configured to issue a notification to a depositary with whom the detachable battery is deposited in the depository when a remaining charge level of the detachable battery attached to the pickup or delivery robot is lower than or equal to a predetermined value, the notification being for requesting the attached detachable battery to be replaced; and a billing section configured to issue a bill for a pickup or delivery service of the package, wherein the depository includes a place serving as a delivery place and/or a pickup place of the package, and when the detachable battery of the pickup or delivery robot is replaced in the depository, the billing section provides an incentive to the depositary of the depository.

2. The robot pickup or delivery system according to claim 1, wherein the notification includes information related to a method for replacing the detachable battery in the pickup or delivery robot.

3. The robot pickup or delivery system according to claim 1, wherein the notification section issues the notification of the request to the depositary through a terminal device of the depositary before the pickup or delivery robot reaches the depository.

4. The robot pickup or delivery system according to claim 1, wherein the notification section outputs the notification when the pickup or delivery robot reaches the depository, the notification being for requesting the detachable battery to be replaced.

5. The robot pickup or delivery system according to claim 1, comprising a charge state obtaining section configured to obtain information related to a remaining charge level of the detachable battery in the depository, wherein when the remaining charge level of the detachable battery in the depository is higher than or equal to a predetermined value, the notification section outputs a notification for requesting the detachable battery to be replaced in the depository.

6. The robot pickup or delivery system according to claim 1, comprising:

a charge state obtaining section configured to obtain information related to a remaining charge level of the detachable battery in the depository; and a route plan section configured to plan a moving route for the pickup or delivery robot to drop in at the delivery place and/or the pickup place of the package, wherein the route plan section plans the moving route to drop in at the depository of the detachable battery whose remaining charge level is higher than or equal to a predetermined value.

7. The robot pickup or delivery system according to claim 6, wherein the route plan section decides the depository to drop in at on the moving route, and an order to drop in at the depository and the delivery place and/or the pickup place on a basis of the remaining charge level of the detachable battery attached to the pickup or delivery robot, positional information related to the depository and the remaining charge level of the detachable battery deposited in each of the depositories, and an amount of power consumed by the pickup or delivery robot per unit traveling distance.

8. The robot pickup or delivery system according to claim 6, wherein, when the remaining charge level of the detachable battery attached to the pickup or delivery robot becomes lower than or equal to a predetermined value during movement, the route plan section changes the moving route to drop in at the depository.

9. The robot pickup or delivery system according to claim 5, wherein a charger to which the detachable battery is connected is distributed to the depository, and the charge state obtaining section obtains information from the charger, the information being related to the remaining charge level of the detachable battery in the depository.

10. A pickup or delivery robot to which a detachable battery is attached, the pickup or delivery robot being configured to pick up or deliver a package, the pickup or delivery robot comprising:

a deposit information obtaining section configured to obtain information related to a depository of the detachable battery;

a notification section configured to issue a notification to a depositary with whom the detachable battery is deposited in the depository when a remaining charge level of the attached detachable battery is lower than or equal to a predetermined value, the notification being for requesting the attached detachable battery to be replaced; and a communication device configured to communicate with a communication device of a management apparatus, wherein the depository includes a place serving as a delivery place and/or a pickup place of the package, the management apparatus comprises a billing section configured to issue a bill for a pickup or delivery service of the package, and when the detachable battery of the pickup or delivery robot is replaced in the depository, the billing section provides an incentive to the depositary of the depository.

* * * * *